Dec. 13, 1938. D. R. ROYER 2,140,172
VIBRATING SCREEN
Filed July 8, 1937 2 Sheets-Sheet 1

Donald R. Royer
INVENTOR

ATTEST-
BY ATTORNEY

Dec. 13, 1938.  D. R. ROYER  2,140,172
VIBRATING SCREEN
Filed July 8, 1937  2 Sheets-Sheet 2

Donald R. Royer
INVENTOR

ATTEST-

BY
ATTORNEY

Patented Dec. 13, 1938

2,140,172

UNITED STATES PATENT OFFICE 2,140,172

VIBRATING SCREEN

Donald R. Royer, Agricola, Fla., assignor, by mesne assignments, to Swift and Company, Chicago, Ill., a corporation of Illinois Application July 8, 1937, Serial No. 152,654

2 Claims. (Cl. 209—415)

This invention relates to an improved bearing support.

One of the objects of the invention is to provide an improved yieldable bearing support.

Another object of the invention is to provide an improved bearing support for vibratory screens.

Other objects of the invention will be apparent from the description and claims which follow.

By way of illustration and not by way of limitation the bearing support of the present invention is exemplified for mounting a vibratory screen.

Reference is had to the drawings in which like characters of reference are used to designate similar elements.

Figure 1:
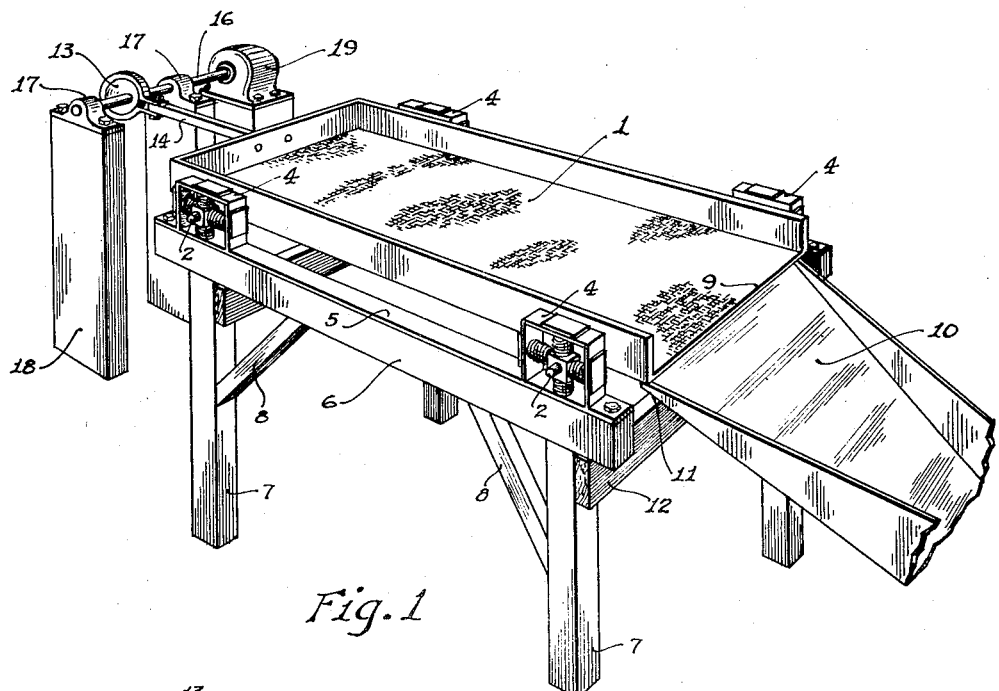
Figure 1 is a perspective view illustrating a vibratory screen in which there is employed the bearing support of the present invention.
Figure 2:
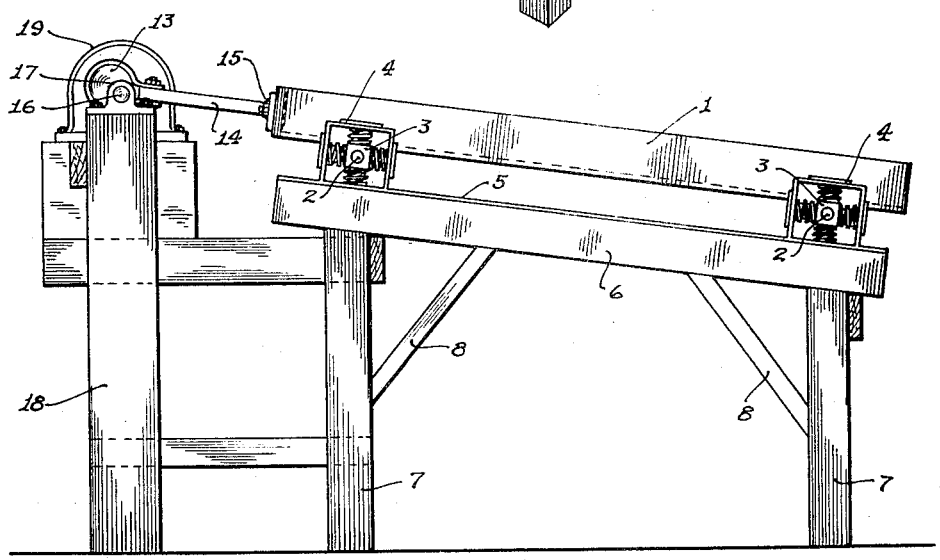
Figure 2 is a side view.
Figure 3:
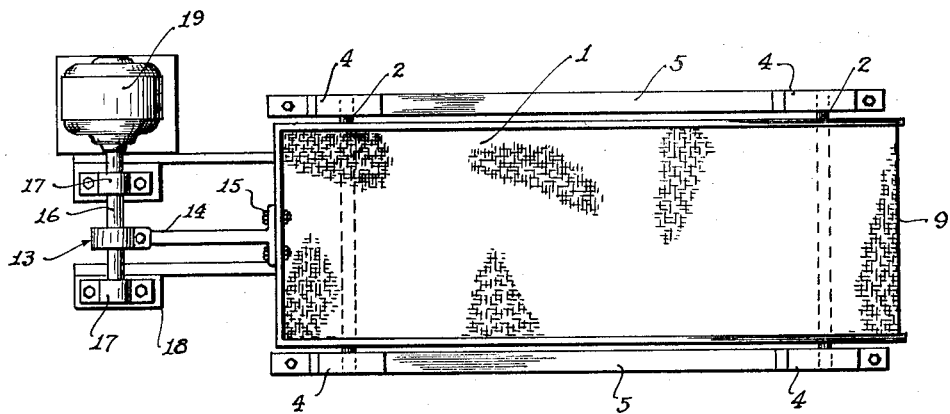
Figure 3 is a plan view.

In the drawings, screen 1 is shown mounted at either end upon a shaft 2, journaled at its ends in bearings 3 yieldably mounted in bearing housings 4. Housings 4 are rigidly secured to side members 5 of framework 6 mounted upon standards or uprights 7 suitably braced by supports 8.

Screen 1 is sloped toward open end 9 for the discharge of material onto chute 10. Chute 10 may be rigidly affixed as at 11, to cross member 12 of framework 6.

Rapid vibratory movement is imparted to screen 1 by eccentric 13 through eccentric lever 14 secured as at 15 to screen 1. Eccentric 13 is secured to shaft 16, journaled in bearings 17 rigidly secured on standards 18. Shaft 16 is driven by variable speed motor 19.

Figure 4:
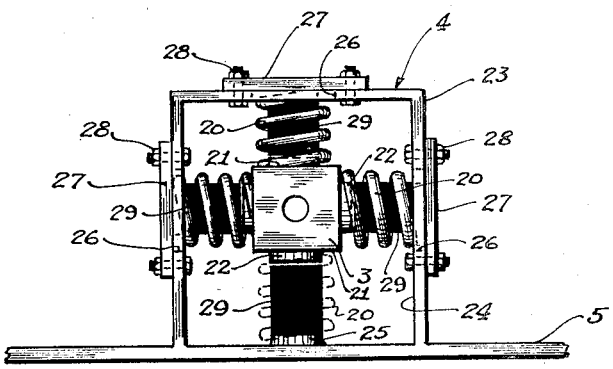
Figure 4 is an enlarged detail of the bearing mounting.

As shown in Figure 4, bearing 3 is yieldably mounted in housing 4 by distended coil springs 20. Bearing 3 is squared at its outer faces, as at 21, each face being provided with a lug 22 for mounting one end of a spring 20.

Bearing housing 4 comprises a squared frame formed of walls 23 each providing an inner face 24 corresponding to one of the faces 21 of bearing 3 for mounting the opposite ends of springs 20. The wall 23 mounted adjacent side member 5 may be provided with a lug 25 for mounting its respective spring. The remaining walls 23 are each provided with an opening 26 through which their respective springs are mounted and secured by plates 27 affixed to the walls 23 as by bolts 28. The wall thicknesses at the openings 26 provide suitable means for anchoring the springs 20 against lateral movement.

Before mounting the springs 20, there is inserted within each of the springs 20 a solid core 29 of rubber or other resilient material. The purpose of the cores 29 is to relieve the heavy strain occasioned against the springs 20 at the moment of starting and stopping the vibratory movement of the screen 1. It is important, however, that the cores 29 do not operate to dampen the movement of the screen when at full speed. This is accomplished by providing the cores 29 of slightly shorter length than the space between the supporting lugs 22 of bearing 3 and the securing plate or means of the walls 23 of housing 4.

The bearing support of the present invention is adapted for yieldably mounting various types of mechanical devices requiring a freedom of movement and especially those in which the movement is relatively rapid.

I claim:

1. In a vibrating screen including means for providing vibratory movement to the screen, means movably mounting the screen on a supporting base comprising opposed bearing members comprising a bearing block mounted on the screen frame and a housing mounted on the base and surrounding the bearing block, a plurality of coil springs connecting the bearing block with the housing, and a solid core of resilient material mounted within the coil of each of the springs, each of the cores of resilient material being mounted on one of the bearing members and terminating slightly short of the other bearing member.

2. In a vibrating screen including means for providing vibratory movement to the screen, means movably mounting the screen on a supporting base comprising a bearing block mounted on the screen frame and a housing mounted on the base and surrounding the bearing block, the bearing block being provided with pairs of opposed outer faces and the housing being provided with an inner face corresponding with each of the outer faces of the bearing block, a coil spring connecting each face of the bearing block with a corresponding face of the housing, and a solid core of resilient material mounted within the coil of each of the springs, the cores of resilient material being secured against the housing faces and terminating slightly short of the bearing faces.

DONALD R. ROYER.